United States Patent [19]
Blankenhorn

[11] 3,980,866
[45] Sept. 14, 1976

[54] DIETARY AID
[76] Inventor: David H. Blankenhorn, 1165 Afton St., Pasadena, Calif. 91103
[22] Filed: Mar. 6, 1974
[21] Appl. No.: 448,494

[52] U.S. Cl. ........................................ 235/61.12 N
[51] Int. Cl.² .................... G06K 19/06; G06K 7/10
[58] Field of Search ............... 235/61.12 N, 61.6 E; 35/17, 48 R

[56] References Cited
UNITED STATES PATENTS

| | | | |
|---|---|---|---|
| 3,181,252 | 5/1965 | Goldschmidt | 35/48 R |
| 3,639,732 | 2/1972 | Crain et al. | 235/61.12 N |
| 3,705,294 | 12/1972 | Kuehnle et al. | 235/61.12 N |
| 3,839,625 | 10/1974 | Chadima, Jr. et al. | 235/61.12 N |
| 3,845,278 | 10/1974 | Rex, Jr. | 235/61.6 E |
| 3,845,280 | 10/1974 | Dillon | 235/61.11 E |

Primary Examiner—Vincent P. Canney
Attorney, Agent, or Firm—Christie, Parker & Hale

[57] ABSTRACT

Apparatus cooperates with a machine readable record member to accumulate a dietary journal. The apparatus includes a plurality of displays arranged for one-by-one exhibition. Each display includes at least one food item representation and, in association therewith, indicia describing discrete selectable quantities of the represented food item. Each food item representation comprises a written description of and a picture illustrating the represented food item. The record member, advantageously a punched card, has a plurality of spaced-apart entry locations and each food item representation corresponds to a different one of the entry locations. In use, the record member is inserted into the apparatus, and, in registration with the exhibition of each display, the corresponding entry locations are exposed. Manually operable input means provide for entering digitally encoded food consumption data at the exposed entry locations.

4 Claims, 5 Drawing Figures

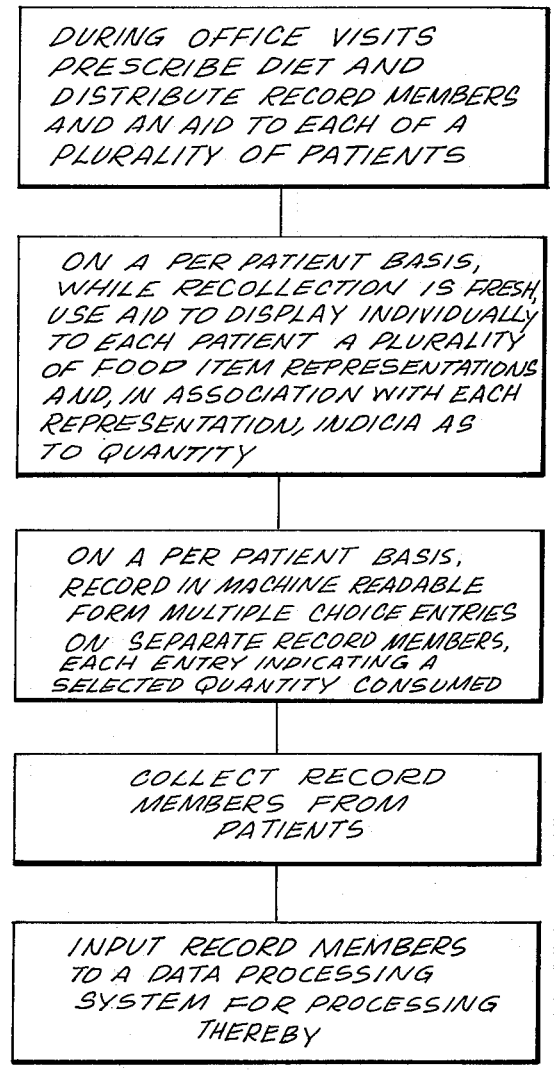

DIETARY AID

BACKGROUND OF THE INVENTION

This invention relates to apparatus and method for accumulating a dietary journal in machine readable form.

There has long been a need to conserve the time of nutrition therapists, whose time is very valuable, whether they be doctors or paraprofessionals. In the past, nutrition therapists have had to spend a great deal of time in attempting to elicit from a patient what his diet consists of. It is of course important for proper diagnosis and therapy that the nutrition therapist have a detailed breakdown or profile of the nature and amounts of food consumed by the patient.

Recently, efforts have been made to employ data processing techniques in the production of such profiles. In a supplement to the journal "Circulation", there was published in March, 1968, the National Diet-Heart Study Final Report. This report describes the development of guidelines for food record coding and the use of computers to process the coded information. Another effort along similar lines is described in the Journal of The American Dietetic Association, volume 48, published in 1966, at pages 101-108. Described therein is the use of an IBM 650 data processing system for reduction of data relating to food consumption.

The foregoing efforts, however, have not involved the preparation, on a per patient basis, of a dietary journal in machine readable form. Instead, either such information as the patient may recall has been elicited during occasional office visits or else ordinary journals have been accumulated and then subsequently reduced to machine readable form. The translation of the ordinary records into machine readable form is of course time-consuming and subject to errors.

As to eliciting information from a patient, his memory is likely to be faulty, particularly as to the details of how much food of what food groups he has eaten weeks before his visit to the therapist's office. This leads to extra time being spent to jog the patient's memory and, even worse, to an incomplete and inaccurate profile.

There has further been a need to facilitate the teaching of a proper diet. During the period of time intervening between office visits, typically weeks, the patient is likely to forget how much of each particular food group he should consume.

The foregoing needs with regard to accumulating information as to a patient's oral intake of nutrients are also applicable as to a patient's oral intake of pills and other prescribed medication.

SUMMARY OF THE INVENTION

This invention is directed to meeting these needs and eliminating these problems through the preparation, on a per patient basis, of a dietary journal in machine readable form.

Apparatus according to the invention has means for releasably holding a machine readable record member such as a standard punch card. The record member has a plurality of spaced-apart entry locations. The apparatus includes a plurality of displays each including at least representation of an item for oral consumption with each item representation corresponding to a different one of the entry locations. Significantly, each item representation comprises a written description of and a picture illustrating the represented item. The picture facilitates quick recognition and enables use even by patients who do not read. Significant also, as to teaching the patient, the picture illustrates a unit quantity of the item whether it be a nutrient or a prescribed medication (for test or otherwise). Preferably, the background for each item representation is color coded as a teaching aid. For example, for a patient on a low cholesterol diet, eggs are advantageously displayed against a red background, and with less undesirable food items being displayed against a yellow background, and with desirable food items being displayed against a green background. In association with each item representation there is indicia describing discrete selectable quantities of the represented item.

The displays are arranged for one-by-one exhibition. In a preferred embodiment the displays form two groups of leaves, each being hinged on an opposite side of a frame. In closed positions, the leaves cover a window for access to the record member. In turning over of the leaves to exhibit the displays one-by-one, there is exposed in registration therewith each of the entry locations corresponding to the exhibited displays. Manually operable input means provide for entering digitally encoded consumption data at the exposed entry locations.

In a preferred feature, in combination with the accumulation of a dietary journal, the apparatus provides for the accumulation in machine readable form of data as to the results of test following the intake of medication such as those typically self-conducted by patients.

BRIEF DESCRIPTION OF THE DRAWINGS

FIG. 5 is a flow chart showing the steps of a method according to the invention.

DETAILED DESCRIPTION

Figure 1:
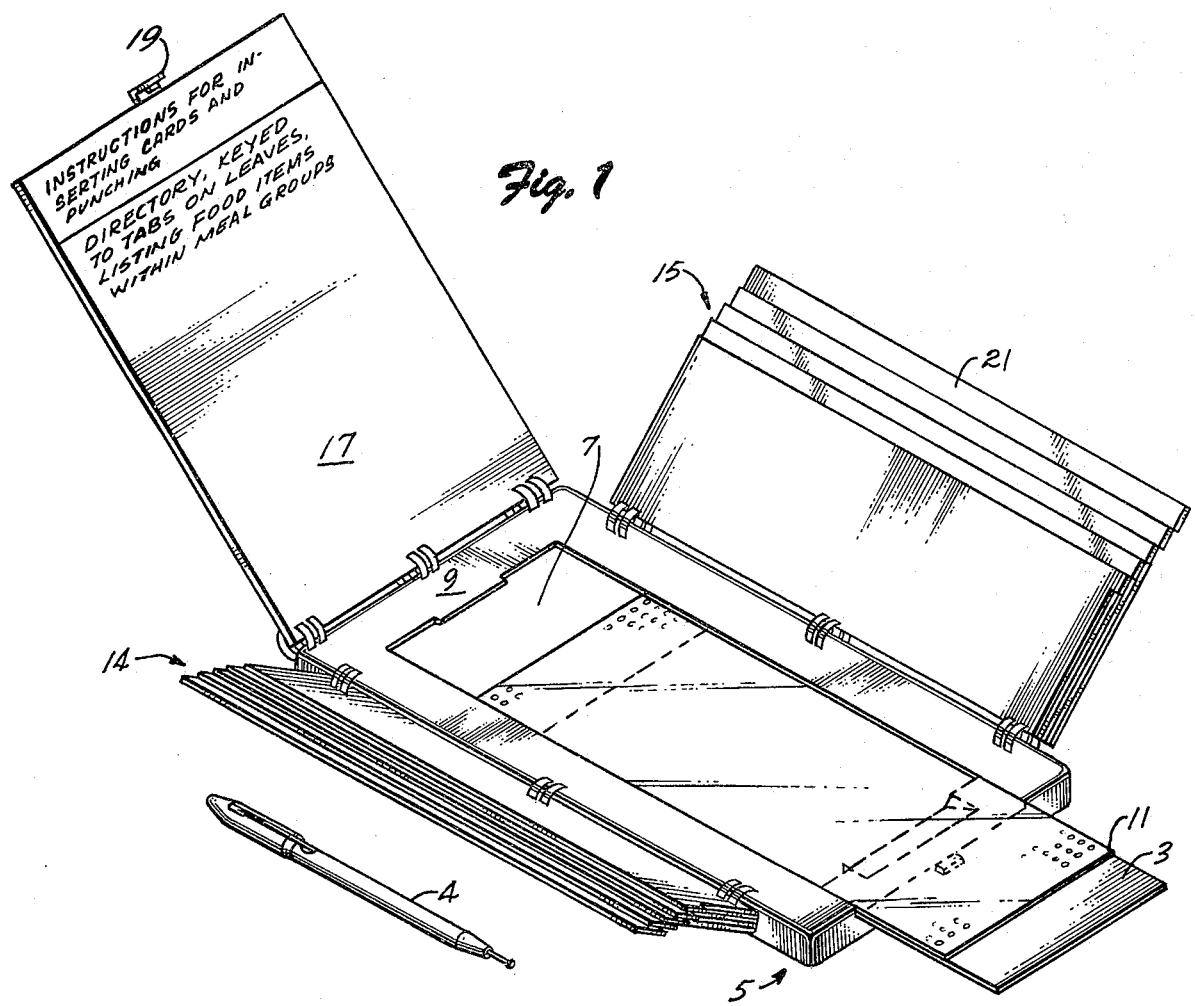
FIG. 1 is a perspective view of a presently preferred dietary aid according to this invention.
Figure 2:
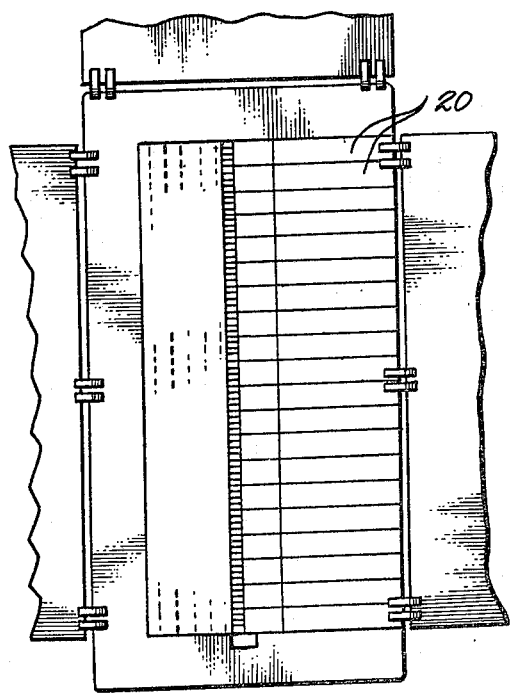
FIGS. 2 and 3 are each plan views, partially broken away, of the dietary aid of FIG. 1, and show the manner in which entry locations of a machine readable record member are exposed in registration with separate displays.

The dietary aid of this invention, the presently preferred embodiment of which is shown in perspective view in FIG. 1, is adapted to cooperate with a machine readable record member to accumulate, on a per patient basis, a dietary journal.

As illustrated in FIG. 1, the record member is preferably a standard punch card 3 having a plurality of coordinate spaces where the card is adapted to be punched to define information that can be recognized by a punch card reader. Manually operable means such as a stylus 4 provide for punching the holes.

The aid includes means for releasably holding one card at a time, which preferably comprises a generally rectangular frame 5 having an elongated, longitudinally extending window 7. The periphery of the window 7 is defined by a generally U-shaped front wall 9 of the frame. At its front lower end, the frame has a recess opening into the window so that the card is slidable into the frame.

The coordinate spaces of a standard punch card are arranged in a coordinate matrix such that they are respectively positioned at the intersections of 12 imaginary lines, each extending parallel to the longitudinal edges of the card, and of 80 imaginary lines, each extending transversely.

After its insertion into the aid of FIG. 1, that which is by convention considered to be the left edge of the punch card is positioned at the top. Thus, from the perspective of a user of the aid, a separate row of 12 spaces is defined by each group of coordinate spaces extending along one of the transverse imaginary lines, and a separate column of 80 spaces is defined by each group of coordinate spaces extending along one of the longitudinal imaginary lines.

Advantageously, some of the columns of spaces (e.g., two columns thereby providing a total available number of 160 coordinate spaces) are pre-punched so as to define information identifying the patient and the type of diet he has been prescribed. With two columns, pre-punched, there remain columns of spaces with 800 (i.e., 80 × 10) coordinate spaces, these being classified in accordance with the preferred embodiment into 200 (i.e., 20 × 10) entry locations. Each of these entry locations includes a different group of four of the coordinate spaces, and each group of four occupies a different one of a matrix of areas on the card.

Advantageously, there is provided a template 11 that slides into and out of the frame in the same manner as the card. The template has a matrix of holes that serve as a guide during punching operations. With the template and the card being in place within the frame one atop the other, each of the holes in the matrix overlies a separate one of the plurality of card coordinates. To facilitate insertion and withdrawal, a notch (shown in dashed lines in FIG. 1) is provided at the front lower end of the frame.

The aid further includes a plurality of displays that are arranged for one-by-one exhibition. In the presently preferred embodiment, as best shown in FIG. 1, the displays are organized into two groups of leaves (indicated generally at 14 and 15), each group being hinged on an opposite longitudinal edge of the frame. The leaves are manually pivotal between open and closed positions, and, in FIG. 1, each of the leaves is shown in its open position.

Preferably, the aid further includes a top cover 17 that is hinged on the top transverse edge of the frame. A catch 19 is fixed to the top cover so that when it is folded down over the displays it can be locked in place.

The use of the aid is presently contemplated as follows. A patient visits a physician who prescribes a therapeutic goal for the patient and provides him with an aid that is adapted for the particular kind of diet prescribed. The patient is given instructions as to how to record information. For reinforcement purposes, advantageously, a summary of these instructions and a directory of food items within the diet is given on the inside of the top cover. Preferably, the directory is arranged in lists of recommended food items, separate lists being given for recommended meals. According to the presently preferred embodiment, a different card is to be used on each day to accumulate information as to the patient's actual food intake on that day. Accordingly, when the patient is initially given the aid and again on each subsequent conference concerning his progress, the patient is given a sufficient number of cards to accumulate a dietary journal covering the period between visits.

Figure 4:
FIG. 4 is a view enlarged with respect to FIG. 3, showing the display 21 in more detail.

An important aspect of the dietary aid of this invention is its advantage in teaching the patient what his diet should consist of. To this end, as best shown in FIG. 4, each display includes at least one food item representation. Preferably, for compactness, each display is divided into twenty separate areas 20. Contained in each area 20 there is a separate food item representation. Thus, there are twenty such food item representations per display in accordance with the presently preferred embodiment. Each food item representation comprises a written description of and a picture illustrating the represented food item. The picture facilitates quick recognition and enables use of the aid even by patients who do not read. Preferably, the background area on the leaf for each food item representation is color coded so as to aid in teaching the prescribed diet. Thus, red is used to indicate an undesirable food item, green to indicate a desirable food item and yellow to indicate a food item in between. For example, for a patient on a low cholesterol diet, the background for a food item such as eggs is colored red.

In association with each food item representation there is indicia describing discrete selectable quantities of the represented food item. In the presently preferred embodiment, each of the areas 20 includes a plurality of sub-areas arranged in a column with each sub-area containing a different one of four quantity indicators such as 2 units, 1 unit, ½ unit, and ¼ unit. Advantageously, the picture portion of a food item representation illustrates the unit quantity of the food. For example, sugar is preferably shown in a teaspoon thereby indicating that amount as a unit. Preferably, as best shown in FIG. 4, each such sub-area registers with a different card coordinate space. FIG. 4 also shows a representation of an item for oral intake of the type in which a prescribed medication in the form of a pill is displayed. It will be evident that providing this food item representation for the display for other breakfast items serves also as a reminder to the patient to take a prescribed dosage. Inasmuch as it is customary for pharmaceutical manufacturers to provide distinctive color coatings for various types of pills, preferably the pills are represented in such distinctive color.

As mentioned above, the displays form two groups of leaves, each group being hinged on an opposite longitudinal edge of the frame. With the leaves being folded over to closed positions, they cover the window 7. In turning the leaves over one-by-one to exhibit the displays, there is exposed in registration therewith each of the entry locations corresponding to the exhibited displays.

The five leaves in each group vary in width. Thus, as to each leaf, with it being in its closed position, a respectively predetermined part of the window is covered and the remaining part is uncovered. On opposite sides of the boundary, defined by the free longitudinal edge of the leaf, there is simultaneously exposed some of the entry locations and the surface of the leaf that is opposite the window. Each of these boundaries defines a line parallel and closely spaced to a respective column of the matrix of areas on the card 3, whereby each of the leaves registers with a different group of entry locations.

Advantageously, for ready reference thereto, each of the leaves has an index tab keyed to the directory given on the top cover. Thus, one of the listed meals is headed "breakfast A", and one of the tabs is identically labeled.

Figure 3:
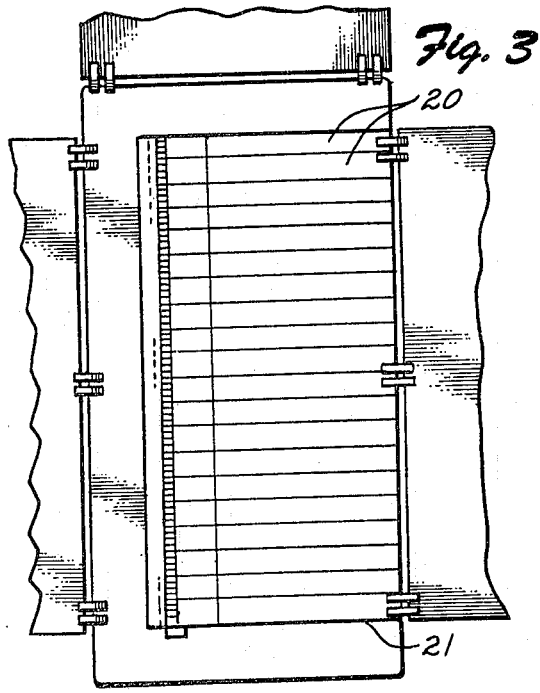

The five leaves in the group that unfolds to the right, register respectively with the five columns of spaces on the left side of the card 3. For example, as shown in FIG. 3, a display 21 of this group so registers in that, while in its closed position, its longitudinal edge is aligned slightly to the right of the first column of 80 spaces on the card 3. Each of its 20 separate areas 20 is thus aligned with a respective one of twenty entry locations. And, with respect to each entry location, the four card coordinate spaces respectively align with the four sub-areas containing quantity indicators that constitute the quantity indicia of the corresponding food item indicia.

The patient uses the stylus 4 to punch holes to record in the first column of coordinate spaces how much during a particular meal he consumed of the food items represented on the display 21. If during that meal he abstained from a particular nutrient, he does not punch a hole. Otherwise, he punches the card coordinate adjacent the quantity indicator corresponding to the number of units he consumed of the represented nutrient. As to recording the patient's oral intake of prescribed medicine, it is advantageous to provide (as indicated in FIG. 4) for a positive indication that zero units were taken.

In a preferred feature, in combination with the accumulation of a dietary journal, the apparatus provides for the accumulation in machine readable form of data as to the results of tests. Thus, one of the areas 20 on an appropriately tabbed leaf can be devoted to a picture illustrative of and instructions as to recording the results of a self-conducted test such as the well-known urine test-tape test. The Ames Company, for example, sells under the trademark "Uristix", reagent strips that can be used in a patient-conducted test for glucose and protein in urine. The test results as to what quantized color range the strip exhibits are recordable in machine readable forms in the same manner as described above with reference to quantized amounts of food items consumed. The test results may be an integral part of medication using the dietary aid.

The dietary aid of this invention has been described with reference to its presently preferred embodiment. It will be apparent to those skilled in the art that there can be constructed and used alternative arrangements that are within the scope of this invention. Merely by way of example, for purposes of recording the information in machine readable form, a mark/sense sheet and pencil approach can be used. This is the type of approach commonly used in connection with multiple-choice tests given by national testing services such as the College Entrance Examination Board and others.

The flow chart of FIG. 5 shows the steps of a method according to this invention. A preliminary step involves the prescribing by a nutrition therapist of a diet for each of a plurality of patients. With each general type of diet, such as low salt or low cholesterol or the like, there is a corresponding aid adapted to accumulate a dietary journal concerning that type of diet. The aids and record members used in connection therewith are distributed, preferably during office visits, to each of a plurality of patients.

On a per patient basis, while their recollection is fresh as to their consumption of food items on their respective diets, each aid is used to display individually to each patient a plurality of food item representations and, in association with each represented food item, indicia describing discrete selectable quantities of the represented food item.

The patient records multiple-choice entries in machine readable form, preferably on separate record members. Each multiple choice entry indicates as a selected one of the selectable quantities the one corresponding to the amount of consumption by the patient of one of the represented food items.

After the information has been recorded, it is inputted to a data processing system, preferably by collecting separate record members for the patient for processing at a central location.

What is claimed is:

1. A method of individually accumulating oral consumption information concerning a plurality of patients, which comprises:
    individually displaying to each patient a plurality of item representations of items for oral consumption, each item representation comprising a written description of the represented item and a picture illustrating both the nature of the represented item and a unit quantity thereof, and in association with each represented item, indicia describing discrete selectable quantities of the represented item with the described quantities bearing fixed ratios to the illustrated unit quantity;
    individually recording information in machine readable form comprising multiple-choice entries, each multiple-choice entry indicating as a selected one of the selectable quantities the one corresponding to the amount of consumption by the patient of one of the represented items; and
    inputting into a digital data processing system the recorded information for processing thereof.

2. A method according to claim 1 wherein the step of recording information includes the step of punching holes in a punch card.

3. A method according to claim 1 wherein the step of individually displaying further includes the step of displaying a picture illustrative of instructions for recording the results of a test having quantized results and, in association therewith, indicia describing possible results; and wherein the step of individually recording includes the step of effecting multiple-choice entries indicating an actual one of said possible results.

4. A method of accumulating information regarding a patient's oral consumption occurring during an interval between visits to a clinic or the like, which comprises:
    distributing to the patient a portable dietary aid for the patient's use between said visits, the dietary aid being adapted to display to the patient a plurality of item representations of items for oral consumption, each item representation comprising a written description of the represented item and a picture illustrating both the nature of the represented item and a unit quantity thereof, and in association with each represented item, indicia describing discrete selectable quantities of the represented items with the described quantities bearing fixed ratios to the illustrated unit quantity;
    individually recording multiple-choice entries in machine readable form on a plurality of punched cards so as to accumulate a dietary journal, each multiple-choice entry indicating as a selected one of the selectable quantities the one corresponding to the amount consumed by the patient of one of the represented items; and
    collecting such punch cards and inputting the collected cards into a digital data processing system for processing of the recorded information.

* * * * *